(12) United States Patent
Griesbach

(10) Patent No.: US 12,511,431 B2
(45) Date of Patent: Dec. 30, 2025

(54) DETERMINING PRIVACY EXECUTION ACTIONS BASED ON CONTEXT DATA ASSOCIATED WITH A USER DEVICE

(71) Applicant: Google LLC, Mountain View, CA (US)

(72) Inventor: David Griesbach, Pacifica, CA (US)

(73) Assignee: GOOGLE LLC, Mountain View, CA (US)

( * ) Notice: Subject to any disclaimer, the term of this patent is extended or adjusted under 35 U.S.C. 154(b) by 234 days.

(21) Appl. No.: 18/296,615

(22) Filed: Apr. 6, 2023

(65) Prior Publication Data

US 2024/0338477 A1    Oct. 10, 2024

(51) Int. Cl.
*G06F 21/62* (2013.01)

(52) U.S. Cl.
CPC .................. *G06F 21/6245* (2013.01)

(58) Field of Classification Search
CPC . G06F 21/6245; G06F 21/6263; G06N 20/00; H04W 12/02
See application file for complete search history.

(56) References Cited

U.S. PATENT DOCUMENTS

| | | | | |
|---|---|---|---|---|
| 9,317,807 B1 * | 4/2016 | Staddon | ............... | G06Q 50/01 |
| 11,122,424 B1 * | 9/2021 | Branscomb | ......... | H04W 12/033 |
| 11,138,242 B2 * | 10/2021 | Malhotra | ............ | G06F 21/6245 |
| 11,727,141 B2 * | 8/2023 | Brannon | ............. | G06F 21/6245 717/101 |
| 2017/0032143 A1 * | 2/2017 | Kong | .................. | G06F 21/6263 |
| 2020/0159960 A1 * | 5/2020 | Jakobsson | ........... | G06F 21/6245 |
| 2020/0196110 A1 * | 6/2020 | Jakobsson | ............. | H04W 76/14 |
| 2020/0275266 A1 * | 8/2020 | Jakobsson | ............... | H04W 4/90 |
| 2021/0103837 A1 * | 4/2021 | Shoemaker | ......... | G06F 21/6218 |
| 2021/0182111 A1 * | 6/2021 | Jakobsson | ............. | G06F 9/5055 |
| 2021/0390190 A1 * | 12/2021 | Walker | ............... | G06Q 30/0236 |

OTHER PUBLICATIONS

International Search Report and Written Opinion for Application No. PCT/US2024/014974, mailed May 28, 2024, 14 pages.
International Preliminary Report on Patentability for Application No. PCT/US2024/014974, mailed Oct. 16, 2025, 9 pages.

* cited by examiner

*Primary Examiner* — Joseph P Hirl
*Assistant Examiner* — Aayush Aryal
(74) *Attorney, Agent, or Firm* — DORITY & MANNING P.A.

(57) ABSTRACT

Example embodiments of the present disclosure provide for an example method including obtaining context data associated with a client computing device as input into a personalized privacy model. The example method includes determining, by the personalized privacy model, privacy settings as output. The example method includes performing, by the client computing device, a proactive privacy execution action based on the privacy settings.

17 Claims, 8 Drawing Sheets

DETERMINING PRIVACY EXECUTION ACTIONS BASED ON CONTEXT DATA ASSOCIATED WITH A USER DEVICE

FIELD

The present disclosure relates generally to personalized privacy models. More particularly, the present disclosure relates to personalized privacy models executed on client devices to predict privacy settings and automatically perform proactive privacy execution actions based on context data.

BACKGROUND

Client devices have many settings associated with the operating system or applications which can be adjusted by a user. The settings can relate to privacy or data sharing preferences.

SUMMARY

Aspects and advantages of embodiments of the present disclosure will be set forth in part in the following description, or can be learned from the description, or can be learned through practice of the embodiments.

In some aspects, the present disclosure provides for an example computing system for determining proactive privacy execution actions based on context data associated with a user device including one or more processors and one or more memory devices storing instructions that are executable to cause the one or more processors to perform operations. In some implementations, the one or more memory devices can include one or more transitory or non-transitory computer-readable media storing instructions that are executable to cause the one or more processors to perform operations. In the example system, the operations can include obtaining, by a client computing device, context data associated with the client computing device as input into a personalized privacy model. In the example computing system, the operations can include determining, by the personalized privacy model, one or more privacy settings as output. In the example computing system, the operations can include performing, by the client computing device, a proactive privacy execution action based on the one or more privacy settings.

In some aspects, the present disclosure provides for an example computer-implemented method. The example method includes obtaining, by a client computing device, context data associated with the client computing device as input into a personalized privacy model including obtaining, by the client computing device, data indicative of a user turning a location data sharing setting on for a navigation application. The example method includes obtaining, by a client computing device, context data associated with the client computing device as input into a personalized privacy model including obtaining, by the client computing device, data indicative of a user initiating a navigation application instance. The example method includes obtaining, by a client computing device, context data associated with the client computing device as input into a personalized privacy model including obtaining, by the client computing device, data indicative of a user completing a navigation application instance; obtaining, by the client computing device, data indicative of a user turning the location data sharing setting off for the navigation application. The example method includes determining, by the personalized privacy model, one or more privacy settings as output, wherein the privacy settings including a location data sharing setting for one or more applications. The example method includes performing, by the client computing device, a proactive privacy execution action based on the one or more privacy settings, wherein the proactive privacy execution action includes setting one or more location data sharing settings for one or more applications to off.

In some aspects, the present disclosure provides for an example transitory or non-transitory computer readable medium embodied in a computer-readable storage device and storing instructions that, when executed by a processor, cause the processor to perform operations. In the example transitory or non-transitory computer readable medium, the operations include obtaining, by a client computing device, context data associated with the client computing device as input into a personalized privacy model. In the example transitory or non-transitory computer readable medium, the operations include determining, by the personalized privacy model, one or more privacy settings as output. In the example transitory or non-transitory computer readable medium, the operations include performing, by the client computing device, a proactive privacy execution action based on the one or more privacy settings.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
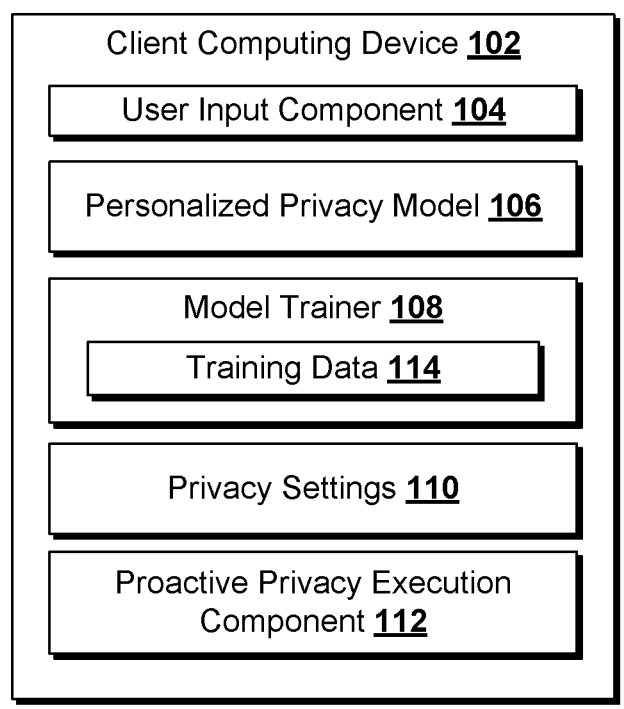
FIG. 1 depicts an example block diagram for a computing system for determining proactive privacy execution actions based on context data associated with a user device.

Generally, the present disclosure is directed to assessing a desired degree of privacy for a user device (or multiple connected user devices) and performing proactive privacy execution actions based on the desired degree of privacy. For instance, the disclosure can provide for a personalized privacy model that can determine a user's privacy threshold and automatically perform a proactive privacy execution action based on the privacy threshold. The proactive privacy execution actions can include automatically adjusting privacy settings of secondary applications, providing notifications indicating applications potential for violating the user's privacy threshold, or automatically preventing an application that will violate the user's privacy from being downloaded to the user device or accessing user data.

More specifically, the present disclosure provides for a personalized privacy model that can obtain context data associated with a user device and generate privacy settings as output. The privacy settings can be utilized to automatically perform proactive privacy executions that can include adjusting customized privacy settings or providing notifications to a user about an application violating preferred privacy settings. The personalized privacy model can determine a desired degree of privacy for a user device and automatically adjust device settings accordingly.

The personalized privacy model can be stored on-device and can obtain data associated with a user's device setting adjustments. For example, the personalized privacy model can obtain context data. The context data can include client device state data (e.g., applications open, date, time, application functionality in use, camera state), user device identifier history data (e.g., search history, activity history), privacy setting data (e.g., sharing settings, hardware modifications), or user input data (e.g., software updates, user feedback). The personalized privacy model can use the obtained context data to generate privacy settings (e.g., device controls, application settings) as output. The computing system can use the privacy setting output to automatically perform proactive privacy execution actions. The proactive privacy execution actions can include, for instance, permitting or denying data sharing with first party or third-party services. Additionally or alternatively, the proactive privacy execution action can include providing notifications via a user interface of the client device which contain a notification about particular applications violating preferred privacy settings. In some implementations, the computing system can obtain user input in response to a proactive privacy execution. The computing system can utilize the user input as training data for the personalized privacy model to generate better privacy setting outputs.

By way of example, a user device can generally have location data sharing set to "off" and only turn the location data sharing to "on" (i) for a navigation application or (ii) for the duration of use of the navigation application. Based on the prior user behavior, the computing systems and methods disclosed herein can learn a user's preferred privacy settings and update privacy settings to a personalized default for the user. For example, the computing system can determine that the user is attempting to download an application that requires geolocation data access. The computing system can block the application from accessing device geolocation data or provide a notification to the user about the application's use of geolocation data to allow the user to provide input of whether to continue to download the application, remove the application from the device, or adjust the privacy settings associated with the application. The personalized privacy models can continually be trained and evolve to update the user device's privacy settings in the background without requiring a user to manually update the user device's privacy settings.

Aspects of the present disclosure provide a number of technical effects and benefits. As one example, the present disclosure provides for increased customization of user privacy. The present disclosure can provide for determining privacy setting preferences and performing actions to increase user privacy customization. Additionally, the personalized privacy model can be stored on the user device. This can decrease the bandwidth usage by reducing transmission of data from the client device to a server computing system. Additionally, the present disclosure provides for decreased use of computing resources due to less user input processing compared to user input processing from constantly obtaining user input associated with a user manually updating the respective settings (e.g., via an interface of a user device). The improvements associated with the computing systems and methods discussed herein can be further understood with reference to the figures.

With reference now to the figures, example embodiments of the present disclosure will be discussed in further detail.

FIG. 1 depicts a block diagram of an example computing system according to embodiments of the present disclosure. The example computing system 100 can include a client computing device 102. The client computing device 102 can include a user input component 104, a personalized privacy model 106, model trainer 108, privacy settings 110, and a proactive privacy execution component 112.

The client computing device can obtaining context data obtained from user input component 104 as input into personalized privacy model 106. Personalized privacy model 106 can output privacy settings 110. The privacy settings 110 can be utilized to automatically perform proactive privacy execution actions via proactive privacy execution component 112.

Personalized privacy model 106 can obtain data associated with user device setting adjustments. For example, the personalized privacy model 106 can obtain context data. The context data can include various types of data associated with the user device (e.g., client device state data, user device identifier history data, privacy setting data, or user input data). The personalized privacy model 106 can use the obtained context data to generate privacy settings 110 (e.g., device controls, application settings) as output. The computing system can use the privacy settings 110 output to automatically perform proactive privacy execution actions via proactive privacy execution component 112. The proactive privacy execution actions can include, for instance, permitting or denying data sharing with first party or third-party services. Additionally or alternatively, the proactive privacy execution actions can include providing notifications via a user interface of client computing device 102 which contain a notification about particular applications violating preferred privacy settings. The notification can include a request for user selection of an input element associated with an option to "dismiss" (e.g., accept existing blocking) or "configure" (e.g., allow the "violation" to occur). The data indicative of the user selection of the input (e.g., obtained context data) can be used by model trainer 108 as training data 114. Model trainer 108 can train personalized privacy model 106 based on feedback obtained from client computing device 102. For instance, feedback can include data obtained via user input component 104 or otherwise relevant to update personalized privacy model 106.

Figure 2:
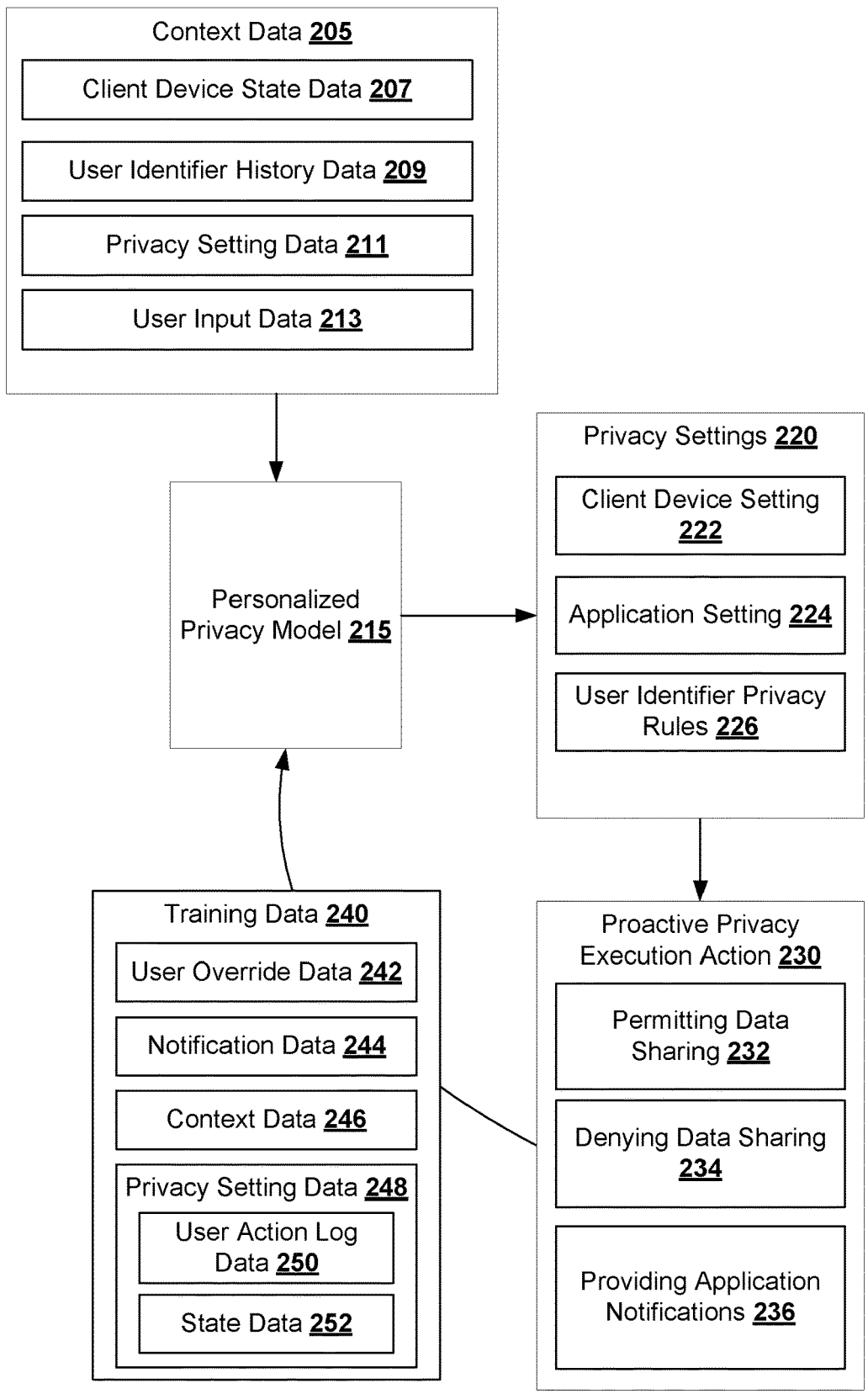
FIG. 2 depicts an example block diagram for determining proactive privacy execution actions based on context data associated with a user device.

FIG. 2 provides additional details of example embodiments of the present disclosure. More particularly, FIG. 2 depicts an example implementation that includes training personalized privacy model 215. Personalized privacy model 215 can obtain context data 205. Context data 205 can include client device state data 207, user device identifier history data 209, or privacy setting data 211, or user input data 213. The context data 205 can be utilized by personalized privacy model 215 to generate output including privacy settings 220. Privacy settings 220 can include client device settings 222, application settings 224, or user device identifier privacy rules 226. Privacy settings 220 can be utilized to automatically perform proactive privacy execution actions 230. Proactive privacy execution actions 230 can include, for example, permitting data sharing 232, denying data sharing 234, or providing application notifications 236.

As described herein, context data 205 can include client device state data 207, user device identifier history data 209, or privacy setting data 211, or user input data 213.

Client device state data 207 can include user device location data, applications data, date data, or time data. User device location data can be location data associated with global positioning system (GPS) data, cellular tower data, ultra-wideband (UWB) anchors, Wi-Fi sensors, quick response (QR) codes, near field communications (NFC), geofencing, radio frequency identification (RFID), or Bluetooth low energy (BLE) beacons.

Application data can include data associated with applications installed on a user device, applications in use on the user device, or the types of applications installed on the user device. Application functionality data can be associated with the functionality of respective applications. Application functionality data can be associated with functionalities of respective applications that are in use (or have previously been in use) by the user device or that are available and have never been used by the user device. Types of applications installed can include functionalities available with the application or functionalities currently in use with the application.

For instance, a camera application can request access to contacts or geolocation. While the functionality of utilizing contacts or geolocation is available, a user device can obtain input indicating that access to contacts or geolocation should be allowed or denied. In some implementations, application state data can include application settings related to data sharing with first-party services. In some implementations, application state data can include application settings relating to data sharing with third-party services.

Date and time data can be associated with certain times of day associated with certain device state changes. For instance, a user device can be associated with location services being turned to "on" during daylight hours and "off" during nighttime hours.

User device identifier history data 209 can include search history or activity history. Search history can include data related to subject matter of the search or the context of the search. For instance, the computing system can perform natural language processing on received user input including a search and determine a semantic intent of the search. Additionally or alternatively, search history data can include data associated with the context of the search performed. For instance, context can include the time of day a search is performed, the type of browser used for the search (e.g., private/incognito or regular browser), the repetition or frequency of the search (e.g., the search is a repeat search), the time of day or day of week the search is performed (e.g., a search is only performed at night), the location the search is performed (e.g., only when not at home, only when not connected to public Wi-Fi).

Privacy setting data 211 can include data sharing settings, hardware modification data, enablement of a VPN, or prior inputs related to user device privacy settings, use of incognito or private web browser. For instance, data sharing settings can include data sharing settings for particular applications or restrictions for collecting certain data.

In some implementations, client device state data 207 can be associated with system hardware. For instance, client device state data 207 can be associated with a camera, microphone, or other user device sensor. For instance, the computing device can obtain data indicative of a camera being covered unless in use by an application. By way of example, the computing system can determine that each instance of a camera application launching begins with a dark or obscured image. The computing system can determine that within 5 seconds of launching the application, the lens of the camera (or image) is no longer obscured. The computing system can determine that this camera state change (e.g., from obscured to clear) is associated with the lens of the camera being uncovered in conjunction with the camera application being launched. Additionally or alternatively, additional hardware modifications can be detected.

User input data 213 can include software updates or user feedback. For instance, user input data 213 can include data associated with availability of software updates. By way of example, data associated with availability of software updates can include data indicative of a user updating software on the device, an amount of time between availability of an update and installation of an update, or whether software updates are scheduled to automatically be performed upon availability. The computing system can determine, based on a user device frequently receiving software updates either automatically or within a threshold amount of time of the software update availability, that the user profile is associated with a greater concern with privacy or security. A user profile that is associated with greater concern with privacy or security can be associated with user device settings indicating a lower tolerance for (i) sharing data or (ii) allowing access to device functionalities from applications.

User feedback can include feedback directly obtained by the user device via a user interface. For instance, user feedback can be obtained by user input data obtained by the computing device and analyzed to determine an intent associated with the feedback. By way of example, user feedback can include training data 240. Additionally or alternatively, user feedback can be obtained by a user selecting user interface elements associated with direct questions about preferences or experiences.

Personalized privacy model 215 can use the obtained context data 205 to generate privacy settings 220 (e.g., device controls, application settings) as output. Personalized privacy model 215 can be a machine-learned model. Personalized privacy model 215 can obtain input including context data 205 and determine output including privacy settings 220. Privacy settings 220 can include client device settings 222, application setting 224, or user device identifier privacy rules 226.

Client device settings 222 can include a GPS setting turned "on" or "off" or other settings which can be altered via a client device operating system interface. Settings can include connection to Wi-Fi networks (e.g., and associated network characteristics such as public Wi-Fi, private Wi-Fi, if the device is discoverable by other devices on the network), Bluetooth (e.g., set to "on" or "off," what devices are connected), cellular data (e.g., personal hotspot turned on, personal hotspot security), VPN (e.g., if a VPN is in use), location services (being enabled or disabled for the device as a whole), tracking (whether the device is allowed to track a user device history), a user device use of a password management feature or application, or any other settings.

Application settings 224 can include settings that can be adjusted within an application that is downloaded on a user device. For instance, application settings can include what data from an application is shared with the user device or other applications, settings associated with a user account associated with the application, access to specific hardware of the user device (e.g., camera, microphone, tactical input, other sensor data). In some instances, application settings can include cross-application data sharing. For instance, downloaded applications can request access to other downloaded applications. By way of example, applications can include contacts, calendars, photos, Bluetooth, local network, microphone, speech recognition, health tracking applications, sensor data applications, media applications (music, podcasts), social media applications, motion applications, file applications, analytics data applications, advertisement data applications, or other applications.

User device identifier privacy rules 226 can include genericized rules that are inferred from current context data 205 and used to recommend or automatically perform proactive privacy execution actions 230.

The computing system can use the privacy settings 220 output to automatically perform proactive privacy execution actions 230. Proactive privacy execution actions 230 can include, for example, permitting data sharing 232, denying data sharing 234, or providing application notifications 236.

In some implementations, permitting data sharing 232 or denying data sharing 234 can be associated with an inference of data that is acceptable to be shared or utilized by first party or third-party services or applications. By way of example, the computing system can obtain a data request from a requesting party. The computing system can compare the privacy settings 220 to the data request from the requesting party. Based on comparing the privacy settings 220 to the data request from the requesting party, the computing system can share data that the user device has previously shared with the requesting party.

For instance, the requesting party can be a social media application. The social media application can request access to user device contacts. The privacy settings 220 can be used by the computing system to determine a rule that the user device is associated with low concern with allowing access to contacts. The computing system can determine this rule based on historical data indicating that the user device generally allows access to contacts (e.g., including allowing contact access to the social media application). The proactive privacy execution actions 230 in this example implementation, can include allowing the social media application to have continued access to the user device contacts.

Additionally or alternatively, based on comparing the privacy settings 220 to the data request form the requesting party, the computing system can deny the request to share data with the requesting party. For instance, the requesting party can be a newly downloaded application. By way of example, the newly downloaded application can request geolocation data. The personalized privacy model 215 can generate privacy settings 220 associated with the user device avoiding sharing geolocation data. In response, the computing system can deny the request for access to the geolocation data.

In some implementations, the requesting party can include an application downloaded on the user device, a content provider service, a first party service, or a third-party service. Based on predicted privacy settings 220, the computing system can determine proactive privacy execution actions 230 to perform.

In some implementations, the requesting party can be associated with a content selection service. In some implementations, the privacy settings 220 can include an indication that a user device is associated with avoiding sharing precise geolocation data. The content selection service can include associated content providers with candidate content items. The content items can be selected to be displayed via a content slot on the user device. In some implementations, the privacy settings 220 can be compared to the content of the candidate content items to adjust the content selection process. In some implementations this can include removing a candidate content item from the candidate content items based on the subject matter of the content item. An example of this implementation is discussed with respect to Coffee Shop A and Coffee Shop B and the respective content items.

For instance, a user device profile can be associated with minimal location sharing settings being turned "on." In response to obtaining data indicative of the user device being located within a threshold distance of Brand A coffee shop, a content selection or generation process can occur. For instance, if a user device has minimal location sharing settings turned to "on" a content item displayed can include a message indicating "there are 5 coffee shops in your area with a coupon." In an alternative example, a user device can have maximal location sharing settings turned to "on." A content item can be generated for display including a message indicating "Brand A coffee shop has a coupon."

Thus, the user device associated with minimal location data sharing settings set to "on" can be transmitted a content item including multiple options. This can be associated with the content provider providing content relevant to a user device location while simultaneously preventing the display of a content item related to a location that would indicate a precise location of the user device being utilized in a content selection or generation process. This can also be utilized to generate a distinction between the level of granularity of location data utilized for different purposes (e.g., applications). For instance, a more granular user device location can be utilized for providing real-time navigation whereas a content provider or content selection service provider can be granted access to less granular location data.

Application notifications 236 can include notifications presented for display via a user interface or automatic adjustments to application settings of applications that are accessible via the user device. For instance, application notifications 236 can include display of a message relating to a request or functionality of an application. For instance, the computing device can determine that an application is being downloaded. The computing system can determine that the application is requesting access to certain data or has certain functionalities. The computing system can provide for display a message associated with the access requests or functionalities via a user interface. In some implementations, the message can be associated with interactive user interface elements that, when selected, cause the computing device to alter the state of the application. For instance, altering the state of the application can include preventing the download of the application, pausing the download of the application, allowing the download of the application, or blocking access to data external to the application. In some implementations, the message can be strictly informational (e.g., providing a message describing the type of data the application is requesting access to or providing a list of functionalities of the application).

In some implementations, the computing system can obtain privacy action data indicative of a privacy action performed by an application. For instance, the privacy action can correspond to a request for access to data. The computing system can compare the privacy action data to determined privacy settings (e.g., privacy settings 220). Based on the comparison of the privacy action data to the determined privacy settings, the computing system can determine a violation of the determined privacy settings. The computing system can automatically perform proactive privacy execution actions 230 based on the privacy settings 220. The proactive privacy execution action can include (i) providing a notification via a user interface of a user device including a message indicating the violation of the preferred privacy setting; or (ii) automatically denying the request for user data from the application.

Privacy settings relating to an operating system of a user device can be initially set or established. The present disclosure relates to implementations of dynamically updating privacy settings 220 for a user device and performing proactive privacy execution actions 230 continually. This allows for dynamic and evolvable device settings to adjust to predicted privacy preferences. This can allow for improved user data privacy. Additionally, this can provide for prioritizing information displayed via a limited user interface. For instance, updates to settings can be performed automatically in the background and the computing system can prioritize when user input should be requested to affect proactive privacy execution actions 230 in real-time.

Personalized privacy model 215 can be trained, for example, using a feedback loop. The feedback loop can include utilization of training data 240. Training data 240 can include proactive privacy execution actions 230 and user response to proactive privacy execution actions 230 as well as other training data. Training data 240 can include user override data 242, notification data 244, context data 246, or privacy setting data 248. Privacy setting data 248 can include user action log data 250 and state data 252.

User override data 242 can be associated with the computing device obtaining data indicative of a user overriding a recommended proactive privacy execution actions 230. For instance, a proactive privacy execution can include denying location data sharing for a navigation application unless the navigation application is in an active navigation application instance (e.g., session, providing directions). The proactive privacy execution can include turning the location data sharing for the navigation application to "off" following the completion of a navigation application instance. The computing system can detect that a user turned the location data sharing for the navigation application to "on." Based on this detection, the personalized privacy model 215 can be updated based on the proactive privacy execution being contradicted by a subsequent user input data obtained by the computing system (e.g., indicative of a user contradicting the recommended privacy execution).

By way of example, the computing system can obtain data including user input responsive to performing the proactive privacy execution actions 230. The computing system can train the machine-learned model (e.g., personalized privacy model 215) based on the data including user input responsive to performing the proactive privacy execution actions 230.

Notification data 244 can include data that causes presentation of a notification via a user interface. Notification data 244 can include data that is obtained by the computing system related to obtained user input. The user input can include, for instance, data indicative of the user selecting an interactive user interface element. The computing system can perform actions in response to obtaining the user input data. For instance, the computing system can proceed with an application download, prevent an application from download completion, save data associated with a user acknowledgement of features related to an application, or other actions.

Context data 246 can include client device state data, user device identifier history data, privacy settings data, or user input data.

Privacy setting data 248 can include user action log data 250 and state data 252. User action log data 250 can include data indicative of a user providing input or adjusting settings. The settings can be associated with privacy (e.g., data sharing settings) or other settings. Thus, the computing device can keep a log of user action log data 250 that provides for a summary of the changes in device state resulting from obtaining user input. State data 252 can include data indicative of a predicted preferred default state. For instance, the predicted preferred default state can be a state of sharing being set to "on" or "off." By way of example, the privacy setting can include that when a navigation application is in use, a location sharing setting should be turned on and when the navigation application is not in use, the location sharing setting should be turned "off." Thus, based on the state of the navigation application, the preferred default state can be predicted.

For instance a user override can include an instance where the computing system obtains user input indicative of selection of an application for download. In response to obtaining the user input and privacy settings, the computing device can perform a proactive privacy execution action. For instance, the proactive privacy execution action can include generating a prompt that recommends the application not be downloaded. The computing device can obtain data indicative of user input of ignoring the prompt (e.g., selecting an interactive input component associated with continuing to download the application). The computing device can utilize the user override data to update the personalized privacy model 215 for improved generation of privacy settings 220 and proactive privacy execution actions 230.

For instance, training data 240 can be utilized by the computing system to train personalized privacy model 215. By way of example, the computing system can obtain data indicative of a user override of a proactive privacy execution action, denying a notification, or altering settings established as a result of the output generated by the personalized privacy model. In response, the personalized privacy model 215 can be updated to output improved privacy settings 220 upon receipt of the next round of context data 205.

Personalized privacy model 215 can be trained using supervised learning. For instance, feature engineering can be learned about privacy settings and used to generate an interpretation and an associated action. Personalized privacy model 215 can be trained using unsupervised learning. For instance, an implementation where the model obtains user device data (e.g., that a user device only travels on routes without no cameras) and generates privacy settings 220 based on the user device data. In some implementations, personalized privacy model 215 can be a combination of multiple models.

Figures 3A, 3B:
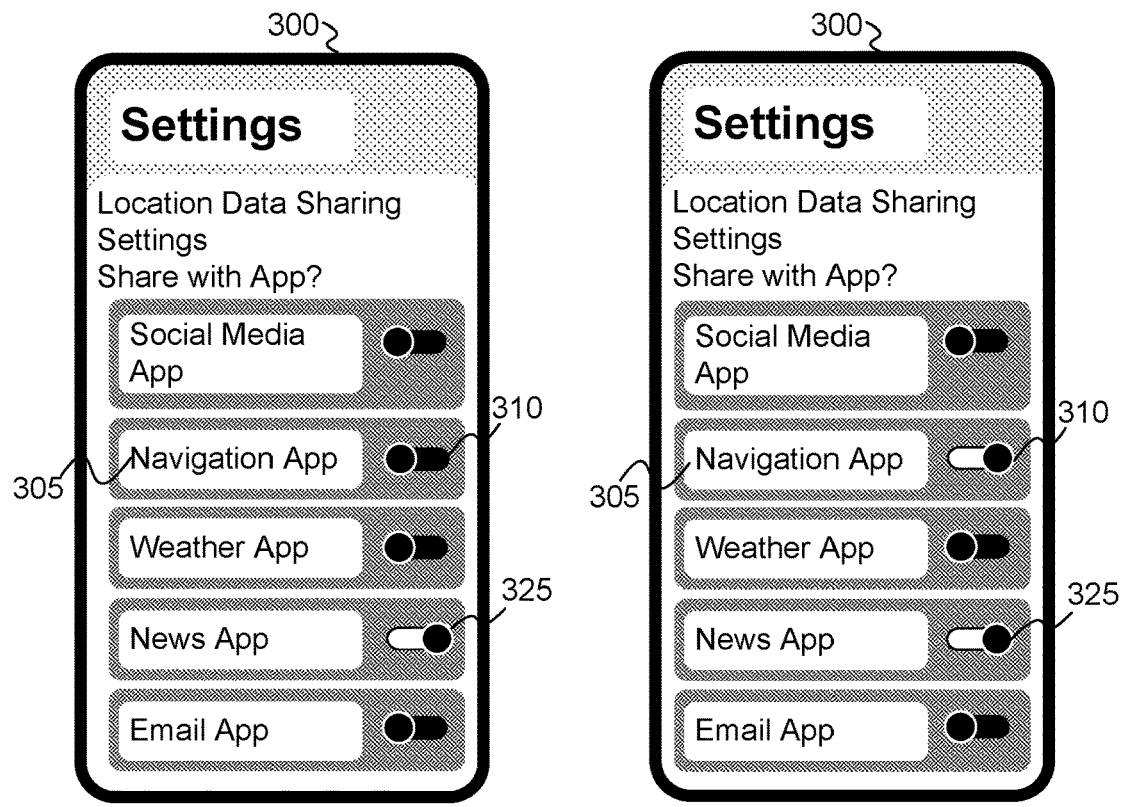
FIG. 3A depicts an example user interface according to example embodiments of the present disclosure.
FIG. 3B depicts an example user interface according to example embodiments of the present disclosure.

FIG. 3A depicts an example user interface on an example user device 300 according to example aspects of the present disclosure. FIG. 3A includes an example settings user interface for display via user device 300. Example user interface can include location data sharing settings. For instance, a device can provide for display an interface including applications and an indication of location data being shared with the respective applications. For example, the applications can include navigation application 305. Navigation application 305 can be associated with toggle 310 indicative of location data sharing settings being turned to "off."

FIG. 3B includes an example settings user interface for display via user device 300. Location data sharing settings can include navigation application 305. Navigation application 305 can be associated with toggle 310 indicative of location data sharing setting being turned to "on." For instance, user device 300 can obtain user input via the user interface. The input can be indicative of data selecting toggle 310. In response to obtaining the input data, the user device can update toggle 310 from the "off" position depicted in FIG. 3A to the "on" position depicted in FIG. 3B.

By way of example, the computing system can obtain context data associated with the user device as input into the personalized privacy model (e.g., as discussed in FIG. 2). Obtaining the context data can include obtaining data indicative of user turning a location data sharing setting on for a navigation application 305. This is depicted by the change in toggle 310 from an "off" position in FIG. 3A to an "on" position in FIG. 3B.

Figures 3C, 3D:
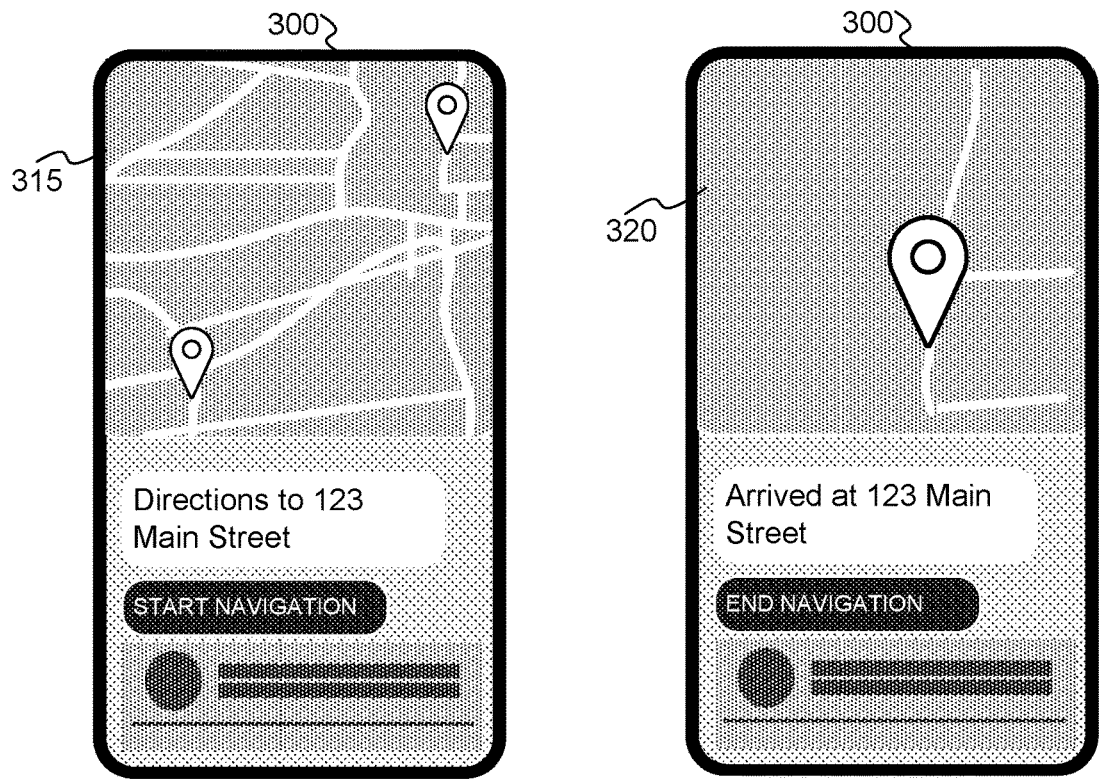
FIG. 3C depicts an example user interface according to example embodiments of the present disclosure.
FIG. 3D depicts an example user interface according to example embodiments of the present disclosure.

The computing system can obtain data indicative of a user initiating a navigation application instance. As depicted in FIG. 3C, the user device can launch a navigation application (e.g., associated with navigation application 305). FIG. 3C depicts an example user interface 315 being provided for display via user device 300. User interface 315 can include data indicative of a start location, end location, and a selectable user interface element. The user device 300 can obtain data indicative of selection of the user interface element. In response, the user device 300 can initiate a navigation application instance. For instance, user device 300 can provide for display directions for transit from start location to end location.

The computing system can obtain data indicative of a user completing a navigation application instance. As depicted in FIG. 3D, a computing system associated with user device 300 can determine that user device 300 has arrived at the end location. The computing system associated with user device 300 can provide example user interface 320 for display. User interface 320 can include data indicative of arrival and an end location associated with the navigation application instance. For instance, the arrival of the user device 300 at end location can be determined using location data. Location data can include data associated with global positioning system (GPS) data, cellular tower data, ultra-wideband (UWB) anchors, Wi-Fi sensors, quick response (QR) codes, near field communications (NFC), geofencing, radio frequency identification (RFID), or Bluetooth low energy (BLE) beacons.

The computing system can obtain data indicative of a user turning the location data sharing setting from "on" to "off" for the navigation application. For instance, within an amount of time of ending the navigation session (e.g., 30 seconds, 5 minutes), the user device 300 can obtain data indicative of a user exiting the navigation application and selecting a user interface element to launch a settings user interface. In response to obtaining data indicative of a user selecting the user interface element, the user device 300 can provide for display a user interface including location data sharing settings.

Figure 3E:
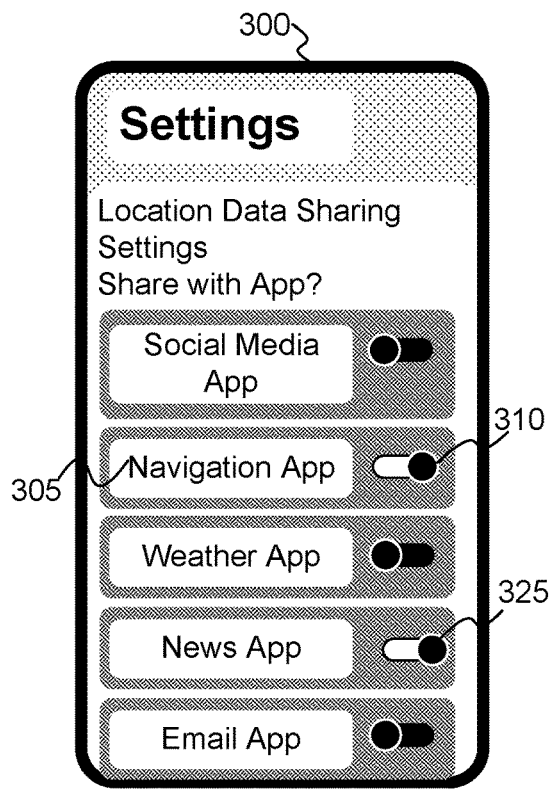
FIG. 3E depicts an example user interface according to example embodiments of the present disclosure.

As depicted in FIG. 3E, the user interface can include settings associated with navigation application 305. The toggle 310 can be in an "on" position. The "on" position of toggle 310 can be indicative of location data sharing being "on" with respect to the navigation application 305.

Figure 3F:
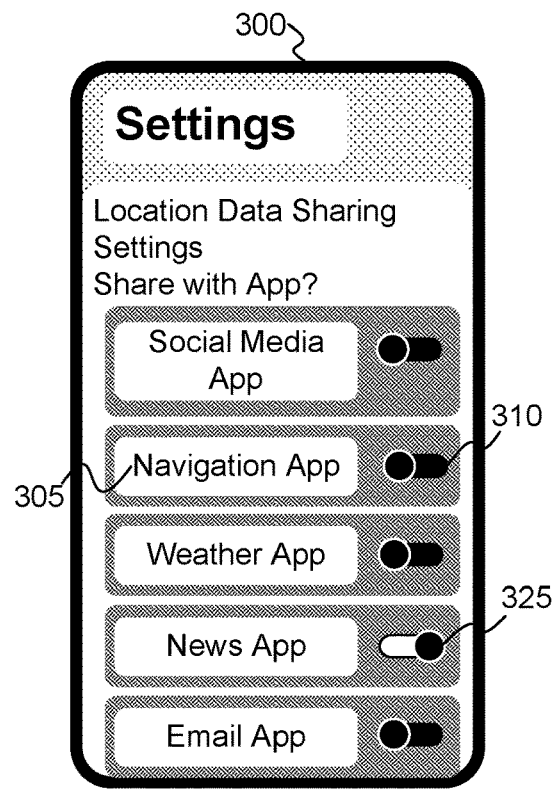
FIG. 3F depicts an example user interface according to example embodiments of the present disclosure.

As depicted in FIG. 3F, user device 300 can obtain user input indicative of selection of toggle 310. In response to obtaining data indicative of the selection of toggle 310, the user device 300 can update the toggle 310 to an "off" position. The "off" position of toggle 310 can be associated with location data sharing for navigation application 305 being turned "off."

As discussed herein, the pattern of obtaining data associated with a user turning on a location sharing, initiating a navigation application instance, completing a navigation application instance, and turning off a location sharing setting can be context data. The context data can be obtained by the personalized privacy model. The personalized privacy model can use the context data associated with toggling location data sharing "on" and "off" with an output of user settings associated with a lower tolerance for data sharing.

Figure 3G:
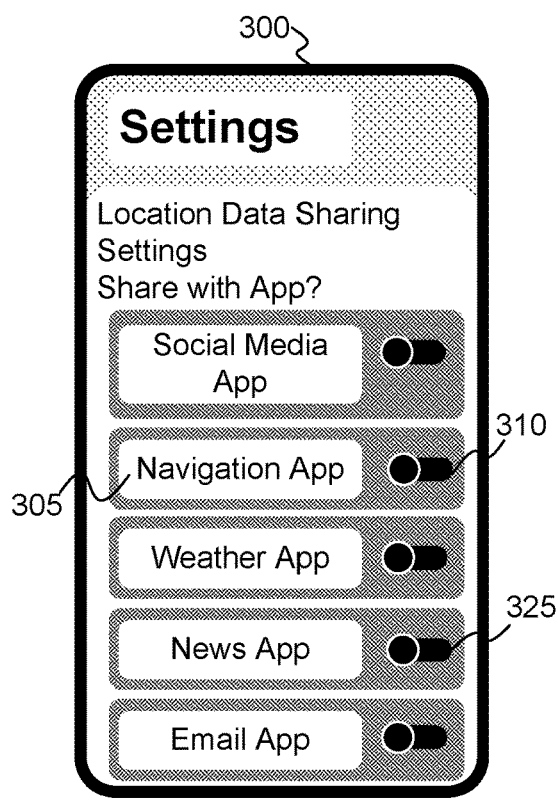
FIG. 3G depicts an example user interface according to example embodiments of the present disclosure.

As depicted in FIG. 3G, the computing system can determine, by the personalized privacy model, privacy settings as output. For instance, the privacy settings can be privacy settings that align with an inference of the user's desired privacy settings. The privacy settings can include a location data sharing setting for applications. The computing system can perform a proactive privacy execution action based on the privacy settings. The proactive privacy execution action can include setting a location data sharing setting for an application to "off." For example, the computing system can automatically (e.g., without user input) proactively turn location data sharing for a news application 325 to "off". This is in response to the personalize privacy model inferring the user's desired privacy settings and proactively adjusting one or more other privacy settings based on the inferred privacy settings.

In some instances, the proactive privacy execution action can be performed automatically in response to a new application download on the user device. For instance, applications that are downloaded to the device can automatically have a location data sharing setting set to "off."

In some implementations, the proactive privacy execution action can include a mapping of a like setting of a first application to a like setting of a second application. For instance, context data associated with adjusting a location setting with a navigation application can be used to infer a preference about an adjustment to a location setting associated with a news application.

In some instances, the proactive privacy execution action can include a mapping of different settings of a first application with different settings of a second application or the performance of different actions relating to a second application. By way of example, context data associated with a user often turning off sharing settings for various data can be used to infer that a user would not want to download an application that requires access to certain kinds of data. The computing system can automatically perform a proactive privacy execution action upon a user attempting to download an application based on the inferred privacy setting of a user wanting to prevent unnecessary or unauthorized sharing of data (e.g., without their knowledge).

In some implementations, the proactive privacy execution can include performing a content selection process. The content selection process can include determining a content slot associated with a user device profile. The content selection process can include determining candidate content items (e.g., a first candidate content item and a second candidate content item). The first candidate content item can be associated with a first privacy setting and the second candidate content item can be associated with a second privacy setting. The content selection process can include selecting the first candidate content item to be provided for display via the content slot based on the first privacy setting of the first candidate content item and the privacy setting including location data sharing setting associated with applications. The computing system can transmit data including instructions that, when executed by the user device, cause the user device to present the selected content item.

The privacy settings of the user device can include a data sharing tolerance value. For instance, a user device with a large number of applications having access to a variety of data types can be associated with higher sharing tolerance value than a user device with a small (or zero) number of applications having access to a variety of data types. By way of example, the data sharing tolerance value can be indicative of a tolerance for sharing of data associated with the user device identifier (e.g., location data, contacts data, health data, cookie settings, pop-up blocking settings, or any other user device identifier data). In some instances, the proactive privacy execution action can include adjusting a user device setting that is unrelated to a location data sharing setting.

Figure 4:
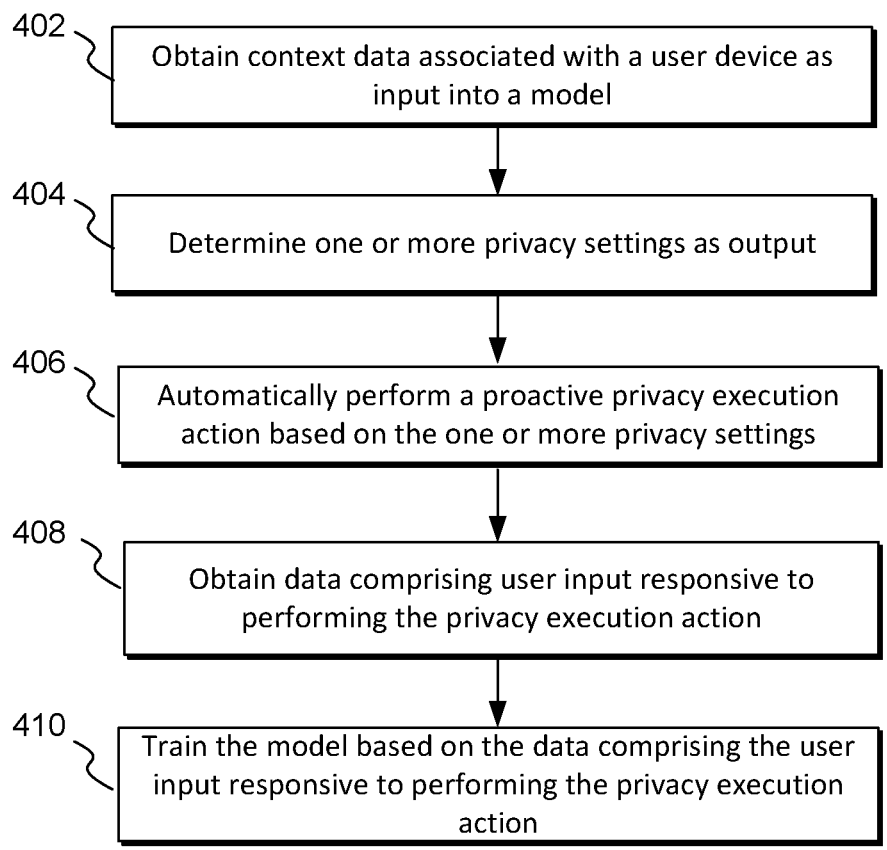
FIG. 4 depicts a flow chart diagram of an example method for determining proactive privacy execution actions based on context data associated with a user device according to example embodiments of the present disclosure.

FIG. 4 depicts a flow chart diagram of an example method to perform according to example embodiments of the present disclosure. Although FIG. 4 depicts steps performed in a particular order for purposes of illustration and discussion, the methods of the present disclosure are not limited to the particularly illustrated order or arrangement. The various steps of method 400 can be omitted, rearranged, combined, or adapted in various ways without deviating from the scope of the present disclosure.

At 402, a computing system (e.g., computing system 500) can obtain context data associated with a user device as input into a model. In some instances, the context data can include context data associated with one or more first applications associated with a client device (e.g., client computing device 102).

At 404, the computing system can determine privacy settings as output. For instance, the computing system can determine, by a personalized privacy model, one or more inferred privacy settings associated with one or more second applications as output.

For instance, the personalized privacy model can include automated extrapolations. The personalized privacy model can include manually mapped rules. By way of example, an automated extrapolation can include detecting a correlation between turning on/off a particular setting (or settings) and an immediate subsequent action (e.g., use of a specific application, opening a web browser, making a phone call). The computing system can determine that a follow-up action of stopping the use of something (e.g., an application, closing a browser and clearing history, ending a phone call) with a subsequent turning on/off of the same (or different) setting that was adjusted before action was performed.

A more specific example is depicted in FIG. 3A-FIG. 3G. This example includes turning location services "on," opening a navigation application (e.g., map application), and upon closure of the navigation application, turning location services "off." From the data obtained from the acquired user input (e.g., user actions), the computing system can generate a rule. For instance, the rule can be "set user preferences to prevent location data sharing when available."

For instance, the privacy settings can be associated with user profile rules. By way of example, a user profile rule can be "minimize location data shared," "do not save log-in information," and the like. The user profile rules can be shared with first party or third-party computing systems to interact with the user device. For instance, the first party or third-party computing systems can be content selection provider devices, content provider devices, applications, or functionalities on the user device associated with the user profile rules.

At 406, the computing system can perform a proactive privacy execution action based on the privacy settings. As described herein, the computing system can perform, by the client computing device, a proactive privacy execution action based on the one or more privacy settings. The proactive privacy execution action can include setting one or more location data sharing settings for the one or more second applications to off.

Returning to the location data sharing navigation application example above. Generated or determined rules can be automatically extended to apply to additional applications. For instance, the rules can be extended to additional applications such as new map applications, delivery applications, weather applications, news applications, social media applications, or other applications that have the ability to utilize location data.

In some instances the rule can be extended to affect third-party content item selection. For instance, based on a determination that user preferences should be set to prevent location data sharing when available, the computing system can determine that a user device should not be served content items that relate to store locations that are within a predetermined threshold for the user device. For instance, a user device can be located within 50 feet of Brand A coffee shop and within 5 miles of Brand B coffee shop. The content selection can be performed by a content selection service. The content selection service can be a first-party service associated with the computing system (e.g., server computing system 530) or can be a third-party service not associated with the computing system (e.g., server computing system 530). Content selection can include selecting content based on a content provider profile associated with the user device. For instance, the content provider profile associated with the user device can include historical content provider data associated with the user device, context data associated with the user device, or any other data that can be used for content selection, content slot bidding, and the like. For instance, a bid modifier can be utilized based on the output data to prevent display of a content item that can be associated with being presented to a user based on the user's proximity to a physical store location.

In some implementations the proactive privacy execution action can include providing for display a "quick setting" interface upon receipt of a user providing input to cause the execution of an application. For instance, fine-grained control settings can be generated by the computing system to surface the quick settings interface when a user device is launching a certain function and when a likelihood exists that the user device is likely to obtain user input indicative of an alteration to user device settings (e.g., in response to launching the application). For instance, when a user device launches a map application, the computing system can prompt the "only when using the application" function for the setting.

Additionally or alternatively, a user can be provided a notification indicating that downloading an application can violate (or be inconsistent with) existing privacy settings and privacy setting history associated with the user device. For instance, knowing a user privacy profile is associated with a preference to prevent sharing data, the computing system can ensure that any apps that are downloaded to the user device align with the privacy profile. For instance, if the applications can function properly without certain private data, then the application can automatically be prevented from accessing that certain private data.

Additionally or alternatively, the computing system can select or generate a content item based on the user device profile. For instance, a user device profile can be associated with minimal location sharing settings. In response to obtaining data indicative of the user device being located within a threshold distance of Brand A coffee shop, a content selection or generation process can occur. For instance, if a user has minimal location sharing settings turned to "on" a content item can say "there are 5 coffee shops in your area with a coupon." In an alternative example, a user can have maximal location sharing settings turned to "on." A content item can be generated for a user that states "Brand A coffee shop has a coupon."

Thus, the user device associated with minimal location data sharing settings set to "on" can be transmitted a content item including multiple options. This can be associated with the content provider providing content relevant to a user device location while simultaneously preventing the display of a content item related to a location that would indicate a precise location of the user device being utilized in a content selection or generation process. This can also be utilized to generate a distinction between the level of granularity of location data utilized for different purposes (e.g., applications). For instance, a more granular user device location can be utilized for providing real-time navigation whereas a content provider or content selection service provider can be associated with a less granular location.

At 408, the computing system can obtain data including user input responsive to performing the proactive privacy execution action. As described herein the user input can include data described in FIG. 2. By way of example, the data can include user override data. The user override data can include obtaining user input associated with setting location data sharing settings for an application to "on" (e.g., when the proactive privacy execution action was to set the location data sharing setting for the application to "off").

By way of example, the model can be a machine-learned model. The obtained user input can include a user override of a recommended proactive privacy execution action. For instance, a recommended proactive privacy execution action can be automatically turning on location data sharing setting when a navigation application is launched on the user device and turning the location data sharing "off" when the instance of the navigation application is completed.

At 410, the computing system can train the personalized privacy model based on the data including the user input responsive to performing the proactive privacy execution action. As described herein, the computing system can utilize obtained user input data to train the personalized privacy model based on obtained data. For instance, the computing system can train the personalized privacy model based on user override data.

In some implementations, the model is a machine-learned model. In some embodiments, the model can be an unsupervised machine-learned model utilized for generating privacy settings. For instance, a user device can be determined to take a number of potential routes to work. While the potential routes can have some distinguishing features, the computing system can determine a number of routes supplied do not include roads with certain characteristics. For instance, a user device can be associated with traversing routes that avoid traffic cameras or street cameras. The computing system can determine that based on the user device traveling along routes without cameras, that the user device has a user profile associated with avoiding videos or tracking. For instance, the computing system can infer that the user device wishes to avoid being tracked or recorded from the behavior of traversing routes that avoid cameras. Thus a rule can include avoiding displaying content relating to a precise location. A proactive privacy execution action associated with the rule can include recommending routes that avoid traffic cameras, or flagging applications that utilize camera functionalities of the user device.

In some implementations, the model can be utilized on the client device. In some implementations, generic logs can be stored on the server computing system. The generic logs can be utilized to develop general rules and push to the client side. These general rules can be used as a starting point for developing personalized rules via the personal privacy model executed on the client device.

In some implementations, a navigation application can recommend a route based on the absence of traffic cameras along that route. The computing system can obtain data indicative of the user device traversing a path that violates that rule. For instance, the user device can traverse a path with numerous traffic or street cameras. A training computing system can utilize this data to train the personalized privacy model. Thus, the personalized privacy model can be updated to reflect that this rule does not align with the user device profile.

An additional or alternative implementation can include a social media implementation. For instance, the computing system can generate user type profiles. For instance, the computing system can generate a celebrity profile or a journalist profile. A celebrity profile can be associated with allowing location data to be utilized for tagging locations in social media posts. A journalist profile can be associated with adjusting a social media account to a "private setting," performing an audit of followers to prevent certain types of followers from following the user (e.g., state-sponsored actors).

In some implementations, the computing device can determine a type of user the user device profile does not wish to be associated with. For instance, a user profile can be associated with having fifty jet tracking social media accounts blocked from following a social media account associated with the user profile. The computing device can generate a rule to avoid association with jet tracking content or accounts. An example associated proactive privacy execution action can be automatically blocking jet tracking accounts that attempt to follow a social media account associated with the user profile. Additionally or alternatively, a proactive privacy execution action can include providing a prompt to set an account to private or automatically setting new accounts created and associated with the user profile to private.

Privacy execution can include adjusting a content selection process to weight actively shared information higher than information that is unintentionally shared or that seems contrary to privacy settings associated with the respective user profile.

For instance, Coffee Shop A and Coffee Shop B can both have associated content items. Coffee Shop A's content selection preference can be associated with display to a user device identified as located within 15 feet of Coffee Shop A's 123 Main Street location. Coffee Shop B's content selection preference can be associated with display to a user device identified as located within 5 miles of Coffee Shop B's 456 Main Street location. The computing system can utilize rules associated with user profiles to select content items for display to the user devices associated with the respective user profiles. For instance, a user profile associated with less location data sharing can receive Coffee Shop B's content item and a user profile associated with more location data sharing can receive Coffee Shop A's content item.

Figure 5A:
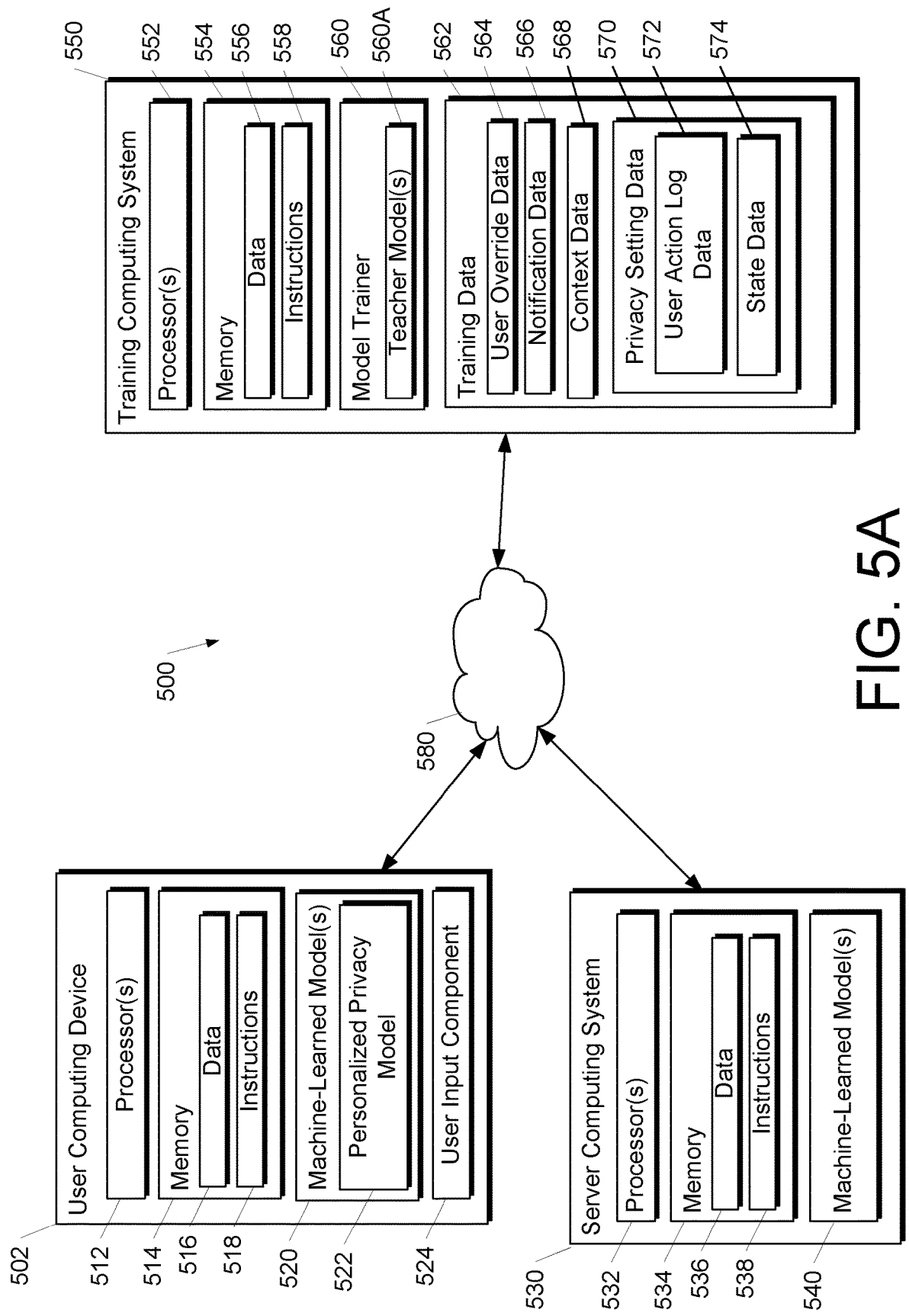
FIG. 5A depicts an example block diagram of a computing system for determining proactive privacy execution actions based on context data associated with a user device according to example embodiments of the present disclosure.

FIG. 5A depicts a block diagram of an example computing system 500 that determines proactive privacy execution actions based on context data associated with a user device according to example embodiments of the present disclosure. The computing system 500 includes a user computing device 502, a server computing system 530, and a training computing system 550 that are communicatively coupled over a network 580.

The user computing device 502 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 502 includes processors 512 and a memory 514. The processors 512 can be any suitable processing device (e.g., a processor core, a microprocessor, an ASIC, an FPGA, a controller, a microcontroller, etc.) and can be one processor or a plurality of processors that are operatively connected. The memory 514 can include non-transitory computer-readable storage media, such as RAM, ROM, EEPROM, EPROM, flash memory devices, magnetic disks, etc., and combinations thereof. The memory 514 can store data 516 and instructions 518 which are executed by the processor 512 to cause the user computing device 502 to perform operations.

In some implementations, the user computing device 502 can store or include machine-learned models 520. For example, the machine-learned models 520 can include a personalized privacy model 522. The machine-learned models 520 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 520 are discussed with reference to FIG. 2 and FIG. 4.

In some implementations, the machine-learned models 520 can be received from the server computing system 530 over network 580, stored in the user computing device memory 554, and then used or otherwise implemented by the processors 512. In some implementations, the user computing device 502 can implement multiple parallel instances of a single machine-learned models 520 (e.g., to perform parallel processing across multiple instances of personalized privacy models).

More particularly, the personalized privacy model 522 can determine privacy settings. In some implementations the personalized privacy model can recommend one of more proactive privacy execution actions to perform based on the privacy settings.

Additionally or alternatively, machine-learned models 540 can be included in or otherwise stored and implemented by the server computing system 530 that communicates with the user computing device 502 according to a client-server relationship. For example, the machine-learned models 540 can be implemented by the server computing system 530 as a portion of a web service (e.g., a content-selection service service). Thus, machine-learned models 520 can be stored and implemented at the user computing device 502 or models 540 can be stored and implemented at the server computing system 530.

The user computing device 502 can also include user input components 524 that receives user input. For example, the user input components 524 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 530 includes processors 532 and a memory 534. The processors 532 can be any suitable processing device (e.g., a processor core, a microprocessor, an ASIC, an FPGA, a controller, a microcontroller, etc.) and can be one processor or a plurality of processors that are operatively connected. The memory 534 can include non-transitory computer-readable storage media, such as RAM, ROM, EEPROM, EPROM, flash memory devices, magnetic disks, etc., and combinations thereof. The memory 534 can store data 536 and instructions 538 which are executed by the processor 532 to cause the server computing system 530 to perform operations.

In some implementations, the server computing system 530 includes or is otherwise implemented by server computing devices. In instances in which the server computing system 530 includes plural server computing devices, such server computing devices can operate according to sequential computing architectures, parallel computing architectures, or some combination thereof.

As described above, the server computing system 530 can store or otherwise include machine-learned models 540. The machine-learned models 540 can include a personalized privacy model. For example, the models 540 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 540 are discussed with reference to FIG. 2 and FIG. 4.

The user computing device 502 or the server computing system 530 can train the models 520 or 540 via interaction with the training computing system 550 that is communicatively coupled over the network 580. The training computing system 550 can be separate from the server computing system 530 or can be a portion of the server computing system 530.

The training computing system 550 includes processors 552 and a memory 554. The processors 552 can be any suitable processing device (e.g., a processor core, a microprocessor, an ASIC, an FPGA, a controller, a microcontroller, etc.) and can be one processor or a plurality of processors that are operatively connected. The memory 554 can include non-transitory computer-readable storage media, such as RAM, ROM, EEPROM, EPROM, flash memory devices, magnetic disks, etc., and combinations thereof. The memory 554 can store data 556 and instructions 558 which are executed by the processor 552 to cause the training computing system 550 to perform operations. In some implementations, the training computing system 550 includes or is otherwise implemented by server computing devices.

The training computing system 550 can include a model trainer 560 that trains the machine-learned models 520 or 540 stored at the user computing device 502 or the server computing system 530 using various training or learning techniques, such as, for example, backwards propagation of errors. For example, a loss function can be backpropagated through the model(s) to update parameters of the model(s) (e.g., based on a gradient of the loss function). Various loss functions can be used such as mean squared error, likelihood loss, cross entropy loss, hinge loss, or various other loss functions. Gradient descent techniques can be used to iteratively update the parameters over a number of training iterations.

In some implementations, performing backwards propagation of errors can include performing truncated backpropagation through time. The model trainer 560 can perform a number of generalization techniques (e.g., weight decays, dropouts, etc.) to improve the generalization capability of the models being trained.

In particular, the model trainer 560 can train the machine-learned models 520 or 540 based on a set of training data 562. The training data 562 can include, for example, user override data 564, notification data 566, context data 568, or privacy setting data 570. Privacy setting data 570 can include user action log data 572 or state data 574.

In some implementations, if the user has provided consent, the training examples can be provided by the user computing device 502. Thus, in such implementations, the model 520 provided to the user computing device 502 can be trained by the training computing system 550 on user-specific data received from the user computing device 502. In some instances, this process can be referred to as personalizing the model.

The model trainer 560 includes computer logic utilized to provide desired functionality. The model trainer 560 can be implemented in hardware, firmware, or software controlling a general purpose processor. For example, in some implementations, the model trainer 560 includes program files stored on a storage device, loaded into a memory and executed by processors. In other implementations, the model trainer 560 includes sets of computer-executable instructions that are stored in a tangible computer-readable storage medium such as RAM, hard disk, or optical or magnetic media.

The network 580 can be any type of communications network, such as a local area network (e.g., intranet), wide area network (e.g., Internet), or some combination thereof and can include any number of wired or wireless links. In general, communication over the network 580 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

The machine-learned models described in this specification can be used in a variety of tasks, applications, or use cases.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes audio data representing a spoken utterance and the task is a speech recognition task. The output can comprise a text output which is mapped to the spoken utterance. In some cases, the task comprises encrypting or decrypting input data. In some cases, the task comprises a microprocessor performance task, such as branch prediction or memory address translation.

FIG. 5A illustrates one example computing system that can be used to implement the present disclosure. Other computing systems can be used as well. For example, in some implementations, the user computing device 502 can include the model trainer 560 and the training data 562. In such implementations, the models 520 can be both trained and used locally at the user computing device 502. In some of such implementations, the user computing device 502 can implement the model trainer 560 to personalize the models 520 based on user-specific data.

Figure 5B:
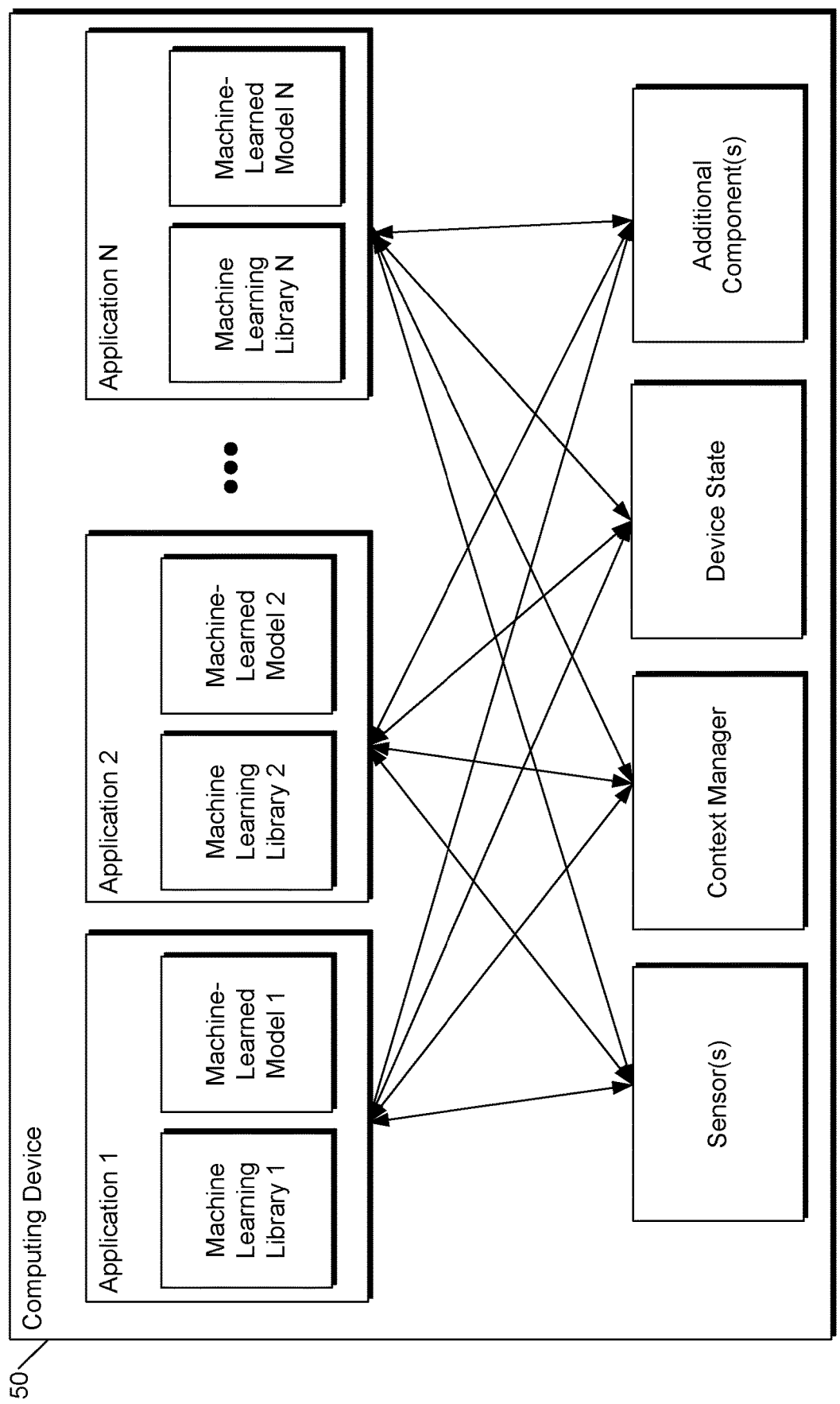
FIG. 5B depicts an example block diagram of a computing system for determining proactive privacy execution actions based on context data associated with a user device according to example embodiments of the present disclosure.

FIG. 5B depicts a block diagram of an example computing device 50 that determines proactive privacy execution actions based on context data associated with a user device according to example embodiments of the present disclosure. The computing device 50 can be a user computing device or a server computing device.

The computing device 50 includes a number of applications (e.g., applications 5 through N). Each application contains its own machine learning library and machine-learned model(s). For example, each application can include a machine-learned model. Example applications include a navigation application, a calendar application, a camera application, a text messaging application, an email application, a dictation application, a virtual keyboard application, a browser application, etc.

As illustrated in FIG. 5B, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 5C:
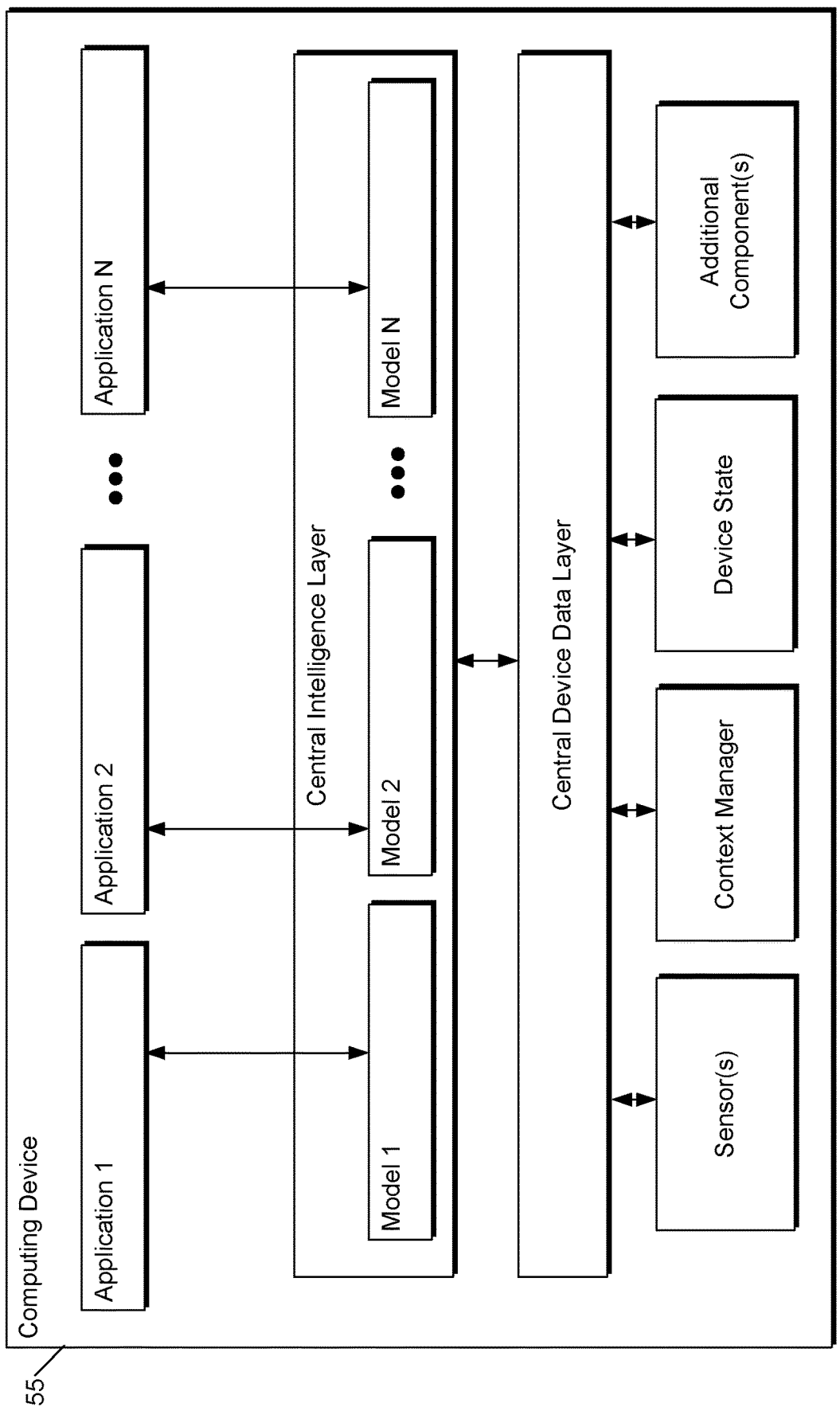
FIG. 5C depicts an example block diagram of a computing system for determining proactive privacy execution actions based on context data associated with a user device according to example embodiments of the present disclosure.

FIG. 5C depicts a block diagram of an example computing device 55 that determines proactive privacy execution actions based on context data associated with a user device according to example embodiments of the present disclosure. The computing device 55 can be a user computing device or a server computing device.

The computing device 55 includes a number of applications (e.g., applications 1 through N). Each application is in communication with a central intelligence layer. Example applications include a navigation application, a calendar application, a camera application, a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 55.

The central intelligence layer can communicate with a central device data layer. The central device data layer can be a centralized repository of data for the computing device 55. As illustrated in FIG. 5C, the central device data layer can communicate with a number of other components of the computing device, such as, for example, one or more sensors, a context manager, a device state component, or additional components. In some implementations, the central device data layer can communicate with each device component using an API (e.g., a private API).

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The depicted or described steps are merely illustrative and can be omitted, combined, or performed in an order other than that depicted or described; the numbering of depicted steps is merely for ease of reference and does not imply any particular ordering is necessary or preferred.

The functions or steps described herein can be embodied in computer-usable data or computer-executable instructions, executed by one or more computers or other devices to perform one or more functions described herein. Generally, such data or instructions include routines, programs, objects, components, data structures, or the like that perform particular tasks or implement particular data types when executed by one or more processors in a computer or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined or distributed as desired. In addition, the functionality can be embodied in whole or in part in firmware or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions or computer-usable data described herein.

Although not required, one of ordinary skill in the art will appreciate that various aspects described herein can be embodied as a method, system, apparatus, or one or more computer-readable media storing computer-executable instructions. Accordingly, aspects can take the form of an entirely hardware embodiment, an entirely software embodiment, an entirely firmware embodiment, or an embodiment combining software, hardware, or firmware aspects in any combination.

As described herein, the various methods and acts can be operative across one or more computing devices or networks. The functionality can be distributed in any manner or can be located in a single computing device (e.g., server, client computer, user device, or the like).

Aspects of the disclosure have been described in terms of illustrative embodiments thereof. Numerous other embodiments, modifications, or variations within the scope and spirit of the appended claims can occur to persons of ordinary skill in the art from a review of this disclosure. For example, one or ordinary skill in the art can appreciate that the steps depicted or described can be performed in other than the recited order or that one or more illustrated steps can be optional or combined. Any and all features in the following claims can be combined or rearranged in any way possible.

Aspects of the disclosure have been described in terms of illustrative embodiments thereof. Numerous other embodiments, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, or equivalents to such embodiments. Accordingly, the subject disclosure does not preclude inclusion of such modifications, variations, or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, or equivalents.

What is claimed is:

1. A computing system, comprising:
   one or more processors; and
   one or more computer-readable media storing instructions that are executable to cause the one or more processors to perform operations, the operations comprising:
   dynamically updating one or more privacy settings for a client computing device by:
     obtaining, by the client computing device, context data associated with the client computing device as input into a personalized privacy model;
     determining, by the personalized privacy model, one or more privacy settings as output;
     automatically performing, by the client computing device, a first proactive privacy execution action based on the one or more privacy settings, wherein the first proactive privacy execution action is performed automatically in the background;

obtaining second context data associated with the client computing device as second input into the personalized privacy model;

determining, by the personalized privacy model, one or more second privacy settings as output; and performing, by the client computing device, a second proactive privacy execution action based on the one or more second privacy settings, wherein the second proactive privacy execution action comprises providing a notification via a user interface of the client computing device requesting selection of an input element.

2. The computing system of claim 1, wherein the proactive privacy execution action comprises at least one of (i) permitting data sharing, (ii) denying data sharing, or (iii) providing application notifications.

3. The computing system of claim 2, wherein permitting the data sharing comprises:

obtaining, by the client computing device, the one or more determined privacy settings from the personalized privacy model;

obtaining, by the client computing device, a data request from a first requesting party;

comparing, by the client computing device, the one or more determined privacy settings to the data request from the first requesting party; and based on comparing the one or more determined privacy settings to the data request, sharing data that the client computing device has previously shared with the first requesting party.

4. The computing system of claim 2, wherein denying the data sharing comprises:

obtaining, by the client computing device, one or more determined privacy settings from the personalized privacy model;

obtaining, by the client computing device, a data request from a first requesting party;

comparing, by the client computing device, the one or more determined privacy settings to the data request from the first requesting party; and based on comparing the one or more determined privacy settings to the data request, denying the request to share data with the first requesting party.

5. The computing system of claim 3, wherein the first requesting party is content provider and wherein the data that the client computing device has previously shared with the first requesting party is utilized in a content selection process.

6. The computing system of claim 2, wherein providing the application notifications comprises:

obtaining, by the client computing device, the one or more determined privacy settings from the personalized privacy model;

comparing, by the client computing device, the one or more determined privacy settings to one or more available application settings; and automatically updating, by the client computing device, the one or more available application settings to align with the one or more determined privacy settings.

7. The computing system of claim 2, providing the application notifications comprises:

obtaining, by the client computing device, privacy action data indicative of a privacy action performed by an application, wherein the privacy action corresponds to a request for access to data;

obtaining, by the client computing device, the determined privacy settings from the personalized privacy model;

comparing, by the client computing device, the privacy action data to the determined privacy settings;

based on comparing the privacy action data to the determined privacy settings, determining, by the client computing device, a violation of the determined privacy settings; and performing, by the client computing device, the proactive privacy execution action based on the one or more privacy settings, wherein the proactive privacy execution action comprises at least one of (i) providing a notification via a user interface of the client computing device comprising a message indicating the violation of the determined privacy setting; or (ii) automatically denying the request for user data from the application.

8. The computing system of claim 1, wherein the context data comprises at least one of (i) client device state data, (ii) user device identifier history data, (iii) privacy setting data, or (iv) user input data.

9. The computing system of claim 1, wherein the determined privacy settings comprise at least one of (i) client device settings, (ii) application settings, or (iii) user device identifier privacy rules.

10. The computing system of claim 1, wherein the personalized privacy model is a machine-learned model.

11. The computing system of claim 10, the operations comprising:

obtaining, by the client computing device, data comprising user input responsive to performing the proactive privacy execution action; and training, by the client computing device, the machine-learned model based on the data comprising user input responsive to performing the proactive privacy execution action.

12. A computer-implemented method comprising:

dynamically updating one or more privacy settings for a client computing device:

obtaining, by a client computing device, context data associated with one or more first applications associated with the client computing device as input into a personalized privacy model;

determining, by the personalized privacy model, one or more inferred privacy settings associated with one or more second applications as output;

automatically performing, by the client computing device, a first proactive privacy execution action based on the one or more privacy settings, wherein the proactive privacy execution action comprises, wherein the first proactive privacy execution action is performed automatically in the background;

obtaining second context data associated with the client computing device as second input into the personalized privacy model;

determining, by the personalized privacy model, one or more second privacy settings as output; and performing, by the client computing device, a second proactive privacy execution action based on the one or more second privacy settings, wherein the second proactive privacy execution action comprises providing a notification via a user interface of the client computing device requesting selection of an input element.

13. The computer-implemented method of claim 12, wherein the proactive privacy execution action comprises:

performing a content selection process by:

determining a first content slot associated with a first user device profile;

determining a first candidate content item and a second candidate content item wherein the first candidate content item is associated with a first privacy setting and the second candidate content item is associated with a second privacy setting;

selecting the first candidate content item to be provided for display via the first content slot based on the first privacy setting of the first candidate content item and the determined privacy setting comprising location data sharing settings associated with the one or more applications; and transmitting data comprising instructions that when executed by the client computing device cause the client computing device to present the selected content item.

14. The computer-implemented method of claim 12, comprising:

obtaining, by the client computing device, user override data, wherein the user override data comprises user input associated with setting one or more location data sharing settings for one or more applications to on; and training, by the client computing device, the personalized privacy model based on the user override data.

15. The computer-implemented method of claim 12, wherein the personalized privacy model comprises a machine-learned model.

16. The computer-implemented method of claim 12, wherein the proactive privacy execution action comprises adjusting user device setting that is unrelated to a location data sharing setting.

17. One or more non-transitory computer readable media storing instructions that are executable by one or more processors to perform operations comprising:

dynamically updating one or more privacy settings for a client computing device by:

obtaining, by the client computing device, context data associated with the client computing device as input into a personalized privacy model;

determining, by the personalized privacy model, one or more privacy settings as output;

automatically performing, by the client computing device, a first proactive privacy execution action based on the one or more privacy settings, wherein the first proactive privacy execution action is performed automatically in the background;

obtaining second context data associated with the client computing device as second input into the personalized privacy model;

determining, by the personalized privacy model, one or more second privacy settings as output; and performing, by the client computing device, a second proactive privacy execution action based on the one or more second privacy settings, wherein the second proactive privacy execution action comprises providing a notification via a user interface of the client computing device requesting selection of an input element.

* * * * *